United States Patent

[11] 3,570,614

[72] Inventor Isacco Del Bagno
  Via Domenico del Bagnoll, Polla, Salerno, Italy
[21] Appl. No. 738,950
[22] Filed June 21, 1968
[45] Patented Mar. 16, 1971
[32] Priority July 3, 1967
[33] Italy
[31] 49110A/67

[54] SELF-PROPELLED VEHICLES WITH IMPLEMENT ATTACHMENT DEVICES
7 Claims, 4 Drawing Figs.

[52] U.S. Cl. ........................................ 180/1,
  180/42, 180/53, 180/55, 180/77, 180/89, 280/34
[51] Int. Cl. ..................................... B60k 17/28, B62d 49/06
[50] Field of Search ........................... 180/1.5, 55, 53, 53 (FE)

[56] References Cited
UNITED STATES PATENTS
2,796,140  6/1957  Knolle ...................... 180/1(.5)X
2,888,088  5/1959  Claas et al. ................. 180/55

FOREIGN PATENTS
881,002    6/1953  Germany ..................... 180/53(FE)
929,397    6/1955  Germany ..................... 180/1(.5)
1,041,166  10/1953 France ....................... 180/1(.5)

Primary Examiner—A. Harry Levy
Attorney—Jecies and Greenside

ABSTRACT: A self-propelled · tool-carrying vehicle for agricultural and industrial purposes and having a frame formed of two longitudinal beams and a driving motor arranged between the longitudinal beams without projecting upwardly beyond the plane formed by the upper surface of the longitudinal beams. All other driving and transmission means except the control means are likewise located below said plane so that the longitudinal beams are free for attachment of working tools or a loading platform at both ends and sides. Additional longitudinal beams of smaller dimensions may be tiltably mounted on said longitudinal beams and provided on their underside with teeth to permit the attachment of the working tools. The main longitudinal beams may be provided with telescopic extensions to provide further possibilities for attachment of working tools.

INVENTOR.
ISACCO DEL BAGNO

SELF-PROPELLED VEHICLES WITH IMPLEMENT ATTACHMENT DEVICES

This invention relates to a self-propelled tool-carrying vehicle especially for agricultural and industrial purposes and comprising a frame formed of two longitudinal beams and a driving motor arranged between the longitudinal beams without projecting upwardly beyond the plane formed by the upper surface of the longitudinal beams.

The two longitudinal beams may be carried by a differential axle assembly on fixed or halftrack pulling and steering wheels. The driving motor and a gearbox may be arranged adjacent the differential axle assembly. At their other ends the longitudinal beams may be carried by another axle assembly on steering wheels, free wheels or pulling wheels according to the particular application of the vehicle which latter may have two or four driving wheels.

The novel vehicle differs from the arrangement in conventional vehicles of this type in that all the above-mentioned members are arranged below the level of the upper surface of the longitudinal beams so as to permit free application of all sorts of working tools and their single or multiple, simultaneous or progressive use in numbers which hitherto have not been possible on similar vehicles.

The conventional motor-driven vehicles and machines, tractors, agricultural cultivating machines, agricultural and industrial tool-carriers and the like do not have the ends and the sides nor the lower central frame portion free for mounting the working tools. Not even the entire upper portion is free for this purpose as the engine will inevitably project in the region of this portion; in no case are all the above-mentioned regions free simultaneously. Therefore, the conventional vehicles can carry and use only relatively few tools either separately or in limited combinations, such as ploughing, hoeing, furrowing, sowing, grubbing, transplanting and grit-spreading machines, containers or truck bodies and the like.

On the other hand, the vehicle forming the object of the present invention can carry working tools and equipment over the entire upper platform from one end to the other except for the small corner portion where the driver's seat is located. Moreover, such tool and equipment can be attached to both ends as well as the sides and the lower central portion of the longitudinal beams. In the latter portion the working tools may be fixed, by an ingenious method, to the main longitudinal beams by two further smaller longitudinal beams located above the former ones and clamping the tools thereon by engagement of the tools with teeth provided on the lower surfaces of the smaller longitudinal beams. The smaller longitudinal beams may be tiltable and actuated by hydraulic rams. Two lateral rods may be provided on the sides of the smaller longitudinal beams to lift the tools secured thereto into an inoperative position.

The main longitudinal beams may further be extendable at their ends by telescope beams to permit their length to be further increased and provide further possibilities for attachment of additional tools.

The upper portion of the vehicle, in addition to carrying a fixed or tiltable platform for securing tools or loading material, may also serve for mounting an additional engine for driving the tools. A splined shaft provided with pulleys may be used to transmit movement to the working tools and such shaft may extend longitudinally along one of the longitudinal beams or transversely thereof and may be carried thereby so as to receive motive power from the gearbox and the differential axle assembly of the engine of the vehicle or from the additional engine.

Thus, together with an appropriate adaptation of the direction of running and driving and, if necessary, of the motor power, a multiple or universal range of application is obtained, which helps enormously to save expenses, not only because there is no further need to procure several driving machines, but also because the proposed vehicle can carry out alone all work which of necessity or for reasons of economy must be done simultaneously or in immediate succession. Such considerations are of particular importance in small agricultural and industrial enterprises.

A preferred embodiment of the invention will now be described by way of example and with reference to the accompanying drawings, in which.

Figure 1:
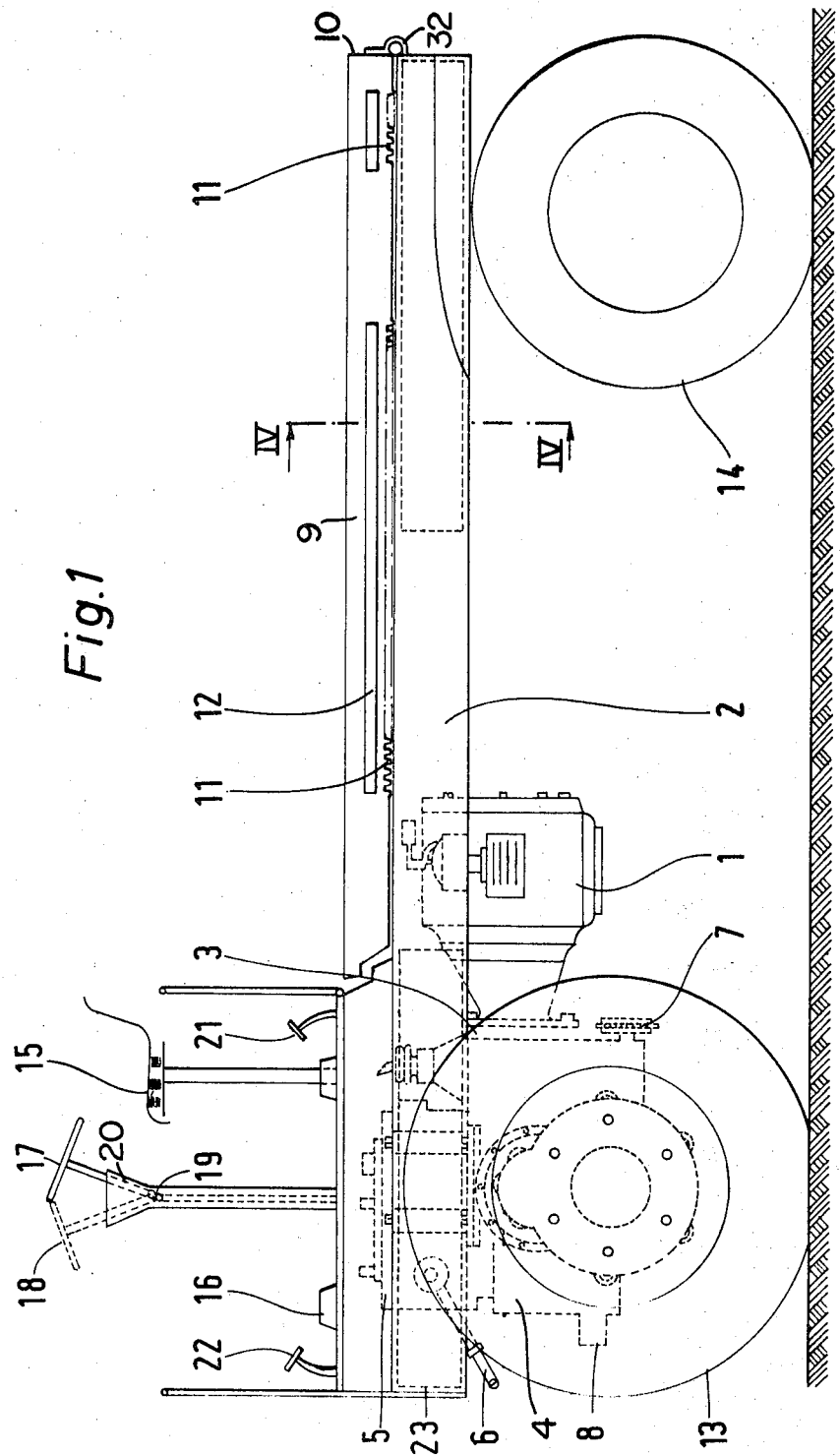
FIG. 1 is a schematic side elevational view of a self-propelled tool-carrying vehicle according to the invention.

As shown in FIG. 1, an engine 1 with opposed cylinders is arranged between and below two longitudinal beams 2 and connected with a speed-change and reverse gear 3 and a differential gear 4 mounted on an axle assembly which also carries a hydraulic jack 5 for actuating the associated lifting arms 6. The gear 3 and differential gear 4 have a power takeoff 7 and 8, respectively.

Figure 3:
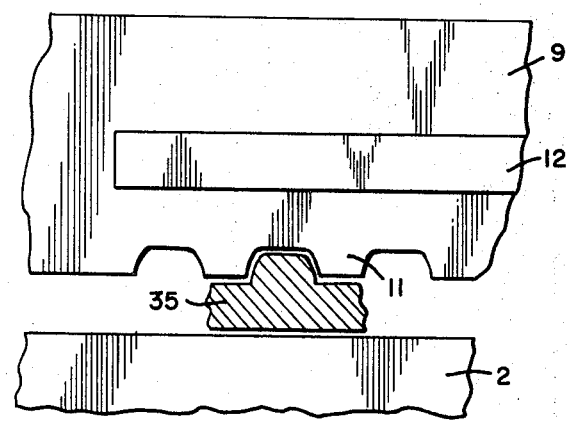
FIG. 3 is a fragmentary schematic detail view, showing the attachment of a working tool.
Figure 4:
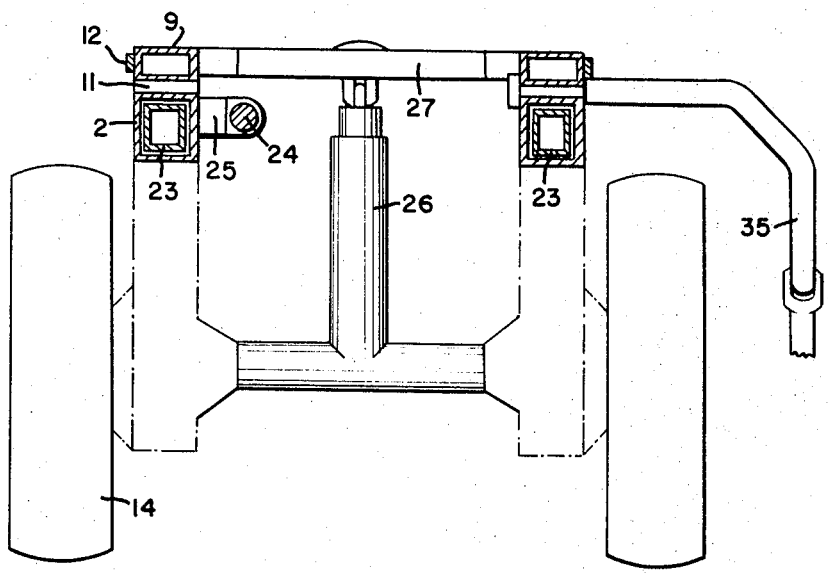
FIG. 4 is a section on lines IV-IV of FIG. 1.

Two other smaller longitudinal beams 9 are mounted on the two main longitudinal beams 2 in the upper portion of the vehicle and may be pivotally connected to the main beams 2 at their rear ends 10, for example, by means of a hinge 32. The lower surface of longitudinal beams 9 is constructed as a rack 11 extending over the major portion of its length and adapted to cooperate with the supporting attachments of the working tools (not shown) when the beams 9 are lowered. The supporting attachment of a working tool is schematically indicated by numeral 35 in FIGS. 3 and 4. Further, the beams 9 carry rods 12 on their lateral surfaces to engage the supporting attachments of such tools for lifting them when required.

Driving wheels are indicated by 13 and free wheels by 14. When the vehicle is of the type having four driving wheels, the wheels 14 are also driving wheels. A driver's seat is indicated by 15 and can be shifted to the point indicated by 16 when the direction of driving is reversed. Numeral 17 indicates a steering wheel which when the direction of driving is reversed can be tilted in the opposite direction into a position indicated by 18 (see FIG. 1) by means of a hinge 19 mounted at the neck of a supporting sleeve 20 provided with a cup-shaped upper portion. Numerals 21 and 22 indicate double sets of clutch, brake and accelerator control pedals. Numeral 23 indicates telescope extensions for the supporting main longitudinal beams 2 to permit their lengths to be increased, when necessary, for obtaining a greater length of the loading platform above the beams and increasing its surface or providing additional possibilities for attachment of working tools.

Figure 2:
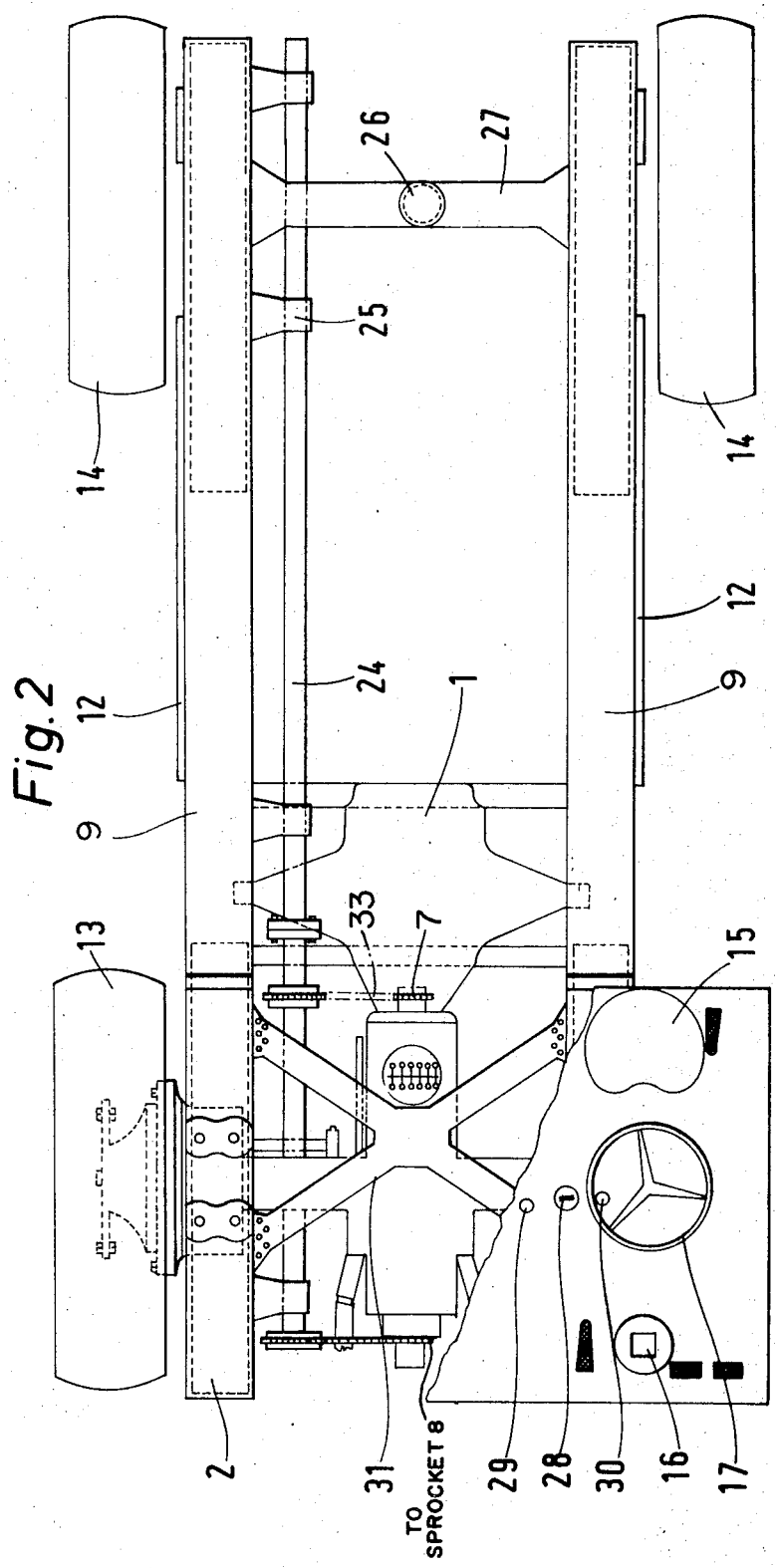
FIG. 2 is a top plan view thereof.

Referring now to FIG. 2, a transmission shaft is vehicle above the beams 2. by 24 and serves to impart movement to the working tools mounted on the vehicle. THe transmission shaft 24 is rotatably and slidably mounted on supporting brackets 25 mounted laterally on one of the longitudinal beams 2. On the other hand, the transmission shaft 24 may also be located in a transverse position between and still supported by the longitudinal beams 2. The transmission shaft 24 may be driven by one of the power takeoffs 7 or 8 (FIG. 1), as desired, for example by means of a transmission chain 33 or 34, respectively, or possibly by an additional engine mounted on the platform of the vehicle above the beam 2. Numeral 26 indicates a hydraulic ram designed to lift the additional tiltable longitudinal beams 9 (FIG. 1) by pressing against a central point of a connecting bar 27 mounted transversely between the beams 9. Numeral 28 indicates a change speed lever, 29 a reverse gear lever, and 30 a handbrake lever. Removable crosswise arranged bars 31 serve to connect the the main longitudinal beams 2. It is believed clear how the novel device operates. To summarize: The novel device is a vehicle on which tool implements can be mounted. To provide maximum freedom of positioning of the implements, no component of the device, except the operator's seat, projects upwardly of the upper surface of the longitudinal beams 2 of which the frame is in part composed. The secondary beams 9, which are not as long as beams 2, are each superimposed on one of the latter. THe beams 9 have lower surfaces which are juxtaposed with the upper surfaces of the respective beams 2 and provided with teeth 11 in the manner of a rack. Beams 9 are pivotably mounted at one end so that they can be tilted upwardly away from and downwardly towards the respective beams 2. An implement to be releasably secured to the vehicle is placed upon the beams 2 whereupon the beams 9 are moved downwardly to clamp portions of the implement between the beams 2 and 9; the teeth 11 mesh with corresponding teeth on the implement to guard against displacement of the latter.

In practice the details of construction may be different from what has been described and illustrated without departing form the spirit or scope of the invention.

I claim:

1. A self-propelled tool-carrying vehicle for agricultural and industrial purposes, comprising frame means including a first pair of longitudinal beams each having an upper surface, and a second pair of longitudinal beams above said first pair and each having a lower surface facing the respective upper surface;

a plurality of teeth on said lower surfaces distributed lengthwise of said second pair of beams;

drive means arranged between said longitudinal beams and downwardly of the general plane of said frame means which is defined by said upper surfaces;

and operating means for raising and lower said second pair of beams with reference to said upper surface for enabling connection of a working tool with said frame means by disposition of such tool on said upper surfaces and subsequent clamping between said upper and lower surfaces in meshing engagement of said teeth with corresponding teeth on said working tool so as to secure the latter against displacement.

2. A self-propelled tool-carrying vehicle as claimed in claim 1, said first pair of beams having unobstructed sides and end portions for attachment of working tools.

3. A self-propelled tool-carrying vehicle as claimed in claim 1; further comprising a driver's seat mounted on said frame means in the region of one corner thereof at one end of said frame means.

4. A self-propelled tool-carrying vehicle as claimed in claim 3, said beams of said second pair having end portions adjacent said one end of said frame means; and further comprising mounting means pivotably mounting said end portions for displacement about a substantially horizontal axis extending transversely to the elongation of said beams.

5. A self-propelled tool-carrying vehicle as claimed in claim 3, said operating means being a fluid-operated ram.

6. A self-propelled tool-carrying vehicle as claimed in claim 1; further comprising telescopic extensions at opposite ends of said first pair of longitudinal beams.

7. A self-propelled tool-carrying vehicle as claimed in claim 1, said second pair of beams being coextensive with a major longitudinal portion of the respective beams of said first pair.